AUTOMATIC BLOCKING OF LINES

Filed Dec. 7, 1953 3 Sheets-Sheet 1

INVENTORS
ANTON CHRISTIAN JACOBAEUS
ARTHUR BERGE
BY [signature]
ATTORNEY

Nov. 17, 1959 A. C. JACOBAEUS ET AL 2,913,529

AUTOMATIC BLOCKING OF LINES

Filed Dec. 7, 1953 3 Sheets-Sheet 2

INVENTORS
ANTON CHRISTIAN JACOBAEUS
ARTHUR BERGE
BY [signature]
ATTORNEY

INVENTORS
ANTON CHRISTIAN JACOBAEUS
ARTHUR BERGE
BY
ATTORNEY

United States Patent Office 2,913,529

Patented Nov. 17, 1959

2,913,529

AUTOMATIC BLOCKING OF LINES

Anton Christian Jacobaeus, Stockholm, and Arthur Berge, Hagersten, Sweden, assignors to Telefonaktiebolaget L M Ericsson, Stockholm, Sweden, a corporation of Sweden Application December 7, 1953, Serial No. 396,592

Claims priority, application Sweden December 31, 1952

4 Claims. (Cl. 179—18)

This invention relates to fully automatic and semi-automatic telephone systems and refers to automatic blocking of lines, particularly subscriber's lines. It is desirable in such telephone exchanges that lines which falsely cause calls and hold selectors, cords or registers in the exchange, should be disconnected automatically and blocked in such a way, that they do not cause a renewed call, and that a called subscriber, who holds his handset lifted after a communication has been completed and the circuits are disconnected, shall not cause an unnecessary call but be automatically connected to a buzzer machine for busy signal. To achieve this each subscriber's line has earlier been provided with special contact devices, which is expensive.

This invention has for a purpose to arrange said automatic blocking in a cheaper manner in such telephone systems, whose line-link-frames are composed of primary and secondary operating bars for cross bar switches and in which each subscriber's line has a break relay and is connected to contact springs in the primary operating bars for cross bar switches. This is achieved by a connecting means for each link between a primary and a secondary operating bar. This connecting means is actuated upon release of the secondary operating bar after a started or completed communication and prepares a holding circuit for the primary operating bar of the link. The holding circuit includes the operating magnet of the primary operating bar and the loop through the subscriber's line. It holds the operating magnet energized when and while the loop is closed. The break relay of the subscriber's line is also held until the primary operating bar is released.

By means of the invention is achieved that the whole connection, except for one primary operating bar for cross bar switches, is released. Since there are many primary operating bars for cross bar switches, numerous blockings may occur without the traffic being disturbed in other respects.

The invention will be described more in detail with reference to the annexed drawings, Figs. 1–4.

All figures show a subscriber's apparatus A, a primary operating bar for cross bar switches SLA and a secondary operating bar for cross bar switches SLB.

Figure 1:
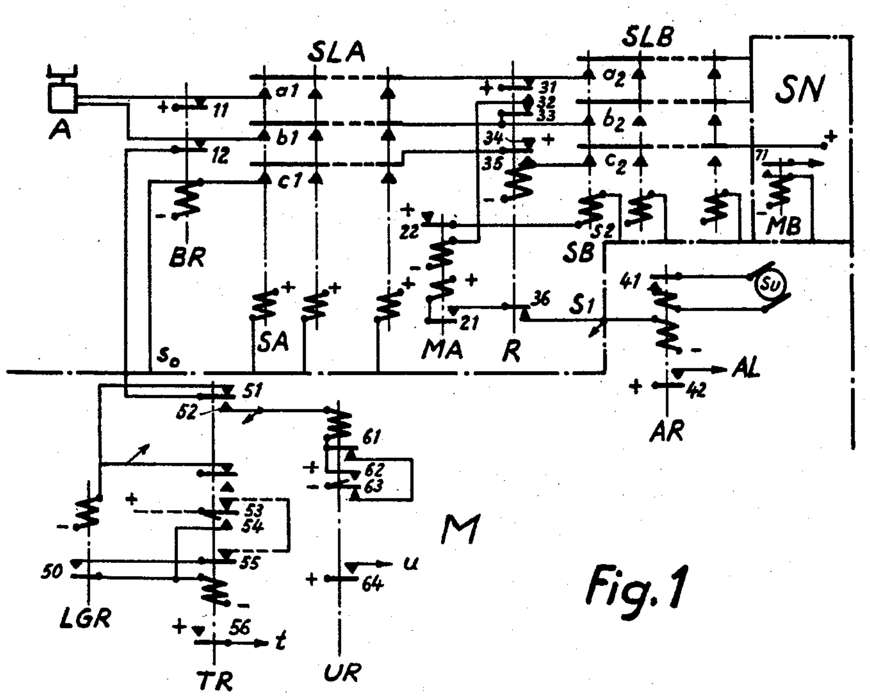
Fig. 1 and Fig. 2 show a circuit system according to the invention controlled by means of an electromagnet connected with the primary operating bar for cross bar switches.

The primary operating bar for cross-bar switches SLA is set by means of selecting magnets SA and an operating magnet MA and the secondary operating bar for cross-bar switches is set by means of selecting magnets SB and an operating magnet MB from a marker M, which is only shown in Fig. 1, because it is equal for all embodiments. Cross bar switches of this kind are well known in the art of telephony and by the physical structure of the cross bar switches does not constitute part of the invention. To the subscriber's line there pertains a relay BR. To the right in each figure there is a link circuit SN, to which the subscriber's line is connected at calls from the subscriber's apparatus A.

Figure 2:
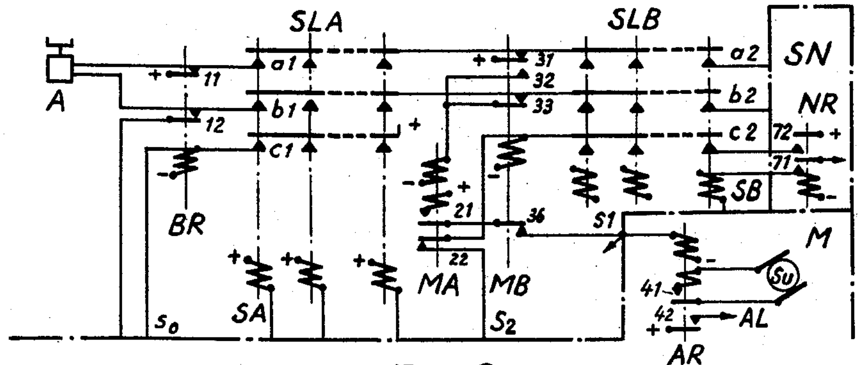

The marker in Fig. 1 is non-essential to the invention and therefore only the calling circuit and an alarm relay are shown. For each ten subscribers there is a calling relay LGR with an auxiliary relay TR. The ten tens relays TR for a group of 100 subscribers constitute a relay chain, in which only one relay at a time may be operated. For each unit there is a relay UR. The ten units relays UR for the hundreds group form a second relay chain, in which only one relay at a time may be operated. At calls to the apparatus A the marker tests the wire *So* to decide if the subscriber's line is free or busy. At calls from the subscriber's apparatus A in Fig. 1 the relay LGR is energized in a circuit through the contacts 11, 12 and 51. The contact 50 is actuated. The relay TR is energized over the contacts 53, 55 and 50. The contacts 51—56 are actuated whereby the relay TR is kept energized through the contacts 54 until the marker M has established the connection to the link circuit SN. The contact 56 indicates within which tens the call is placed. Then the relay UR is energized through the contacts 11, 12, 52, 61 and 63. The contacts 61—64 are actuated. The contact 64 indicates the units digit for the calling subscriber's line. The marker M then selects a free link circuit SN and a free primary operating bar for cross-bar switches SLA, operates the selecting magnets SA and SB and the operating magnet MB. The test circuit for SLA runs through the wire *s2*, the selecting magnet SB and the contact 22. The operating magnet MB closes the contacts *a2*, *b2* and *c2* and a holding contact 71. The relay R is operated by the link circuit SN through the contact *c2*. The contacts 31—36 are actuated. The operating magnet MA is energized through its upper winding and the contact 32. The contacts 21, 22, *a1*, *b1* and *c1* are actuated. The relay BR is energized over the contacts *c2*, 35 and *c1*. The contacts 11 and 12 are opened. The apparatus A is then connected to the link circuit SN. The continued switching operation for the setting up of a connection is supposed to be normal for known telephone systems. If the link circuit SN is released, e.g. by a time device or by an operator while the loop through the subscriber's apparatus A is still closed the operating magnet MB releases its armature and the contacts *a2*, *b2* and *c2* are closed. The relay R releases its armature swiftly whereas the relay BR releases a little more slowly. The contact 34 is actuated so that relay BR is kept operated. At the same time the following circuit for holding the operating magnet MA is completed: +, contacts 31 and *a1*, the loop through the apparatus A, contacts *b1* and 33, the upper winding of the operating magnet MA, to minus. The subscriber's line is thus blocked. The contact 22 keeps the operating bar SLA marked occupied and the contact 21 keeps a circuit for the alarm relay AR closed. The contacts 41—42 are actuated. A tone from the buzzer generator *Su* is transformed between the windings in the alarm relay AR and the windings in the operating magnet MA to the apparatus A. The contact 42 closes a circuit for a time alarm device AL. Fig. 2 differs from Fig. 1 in that the secondary operating bar for cross bar switches SLB is turned so, that its contact strips are interconnected with the contact strips of the primary operating bar SLA and the link circuits SN become connected to spring sets in the operating bar SLB. In this case the operating magnet MB of the secondary operating bar for cross-bar switches may take over the functions of the relay R in Fig. 1. After the marker M has selected a free link circuit SN the selecting magnet SB and a relay NR are operated. The contacts 71—72 are actuated. Contact 71 is a holding contact. At the same time the selecting magnet SA, which indicates the calling apparatus A, is operated and selects a free operating bar for cross-bar switches SLA, which occurs by means of a test circuit through the wire *s*2, the contact 22 and the winding on the operating magnet MB. The test is supposed to take place by means of so weak a current that the magnet MB is not operated. Then the current in the test circuit is increased in such a way that the operating magnet MB attracts its armature. The contacts 31—36 and *a*2, *b*2 and *c*2 are actuated. The operating magnet MA is energized through the contact 32. The contacts 21—22, *a*1, *b*1 and *c*1 are actuated. The relay BR is energized through the contact *c*1. Contacts 11—12 are actuated. The operating magnet BM is then held in a circuit through the contacts 72 and *c*2.

If then the link circuit SN is released by the relay NR releasing its armature the operating magnet MB is released and the contacts 31—36 are restored. The operating magnet MA is held in the following circuit: +, contacts 31 and *a*1, the loop through the apparatus A, contacts *b*1 and 33, the upper winding of the operating magnet MA, to minus. The alarm relay AR is operated as is described for Fig. 1.

Figure 3:
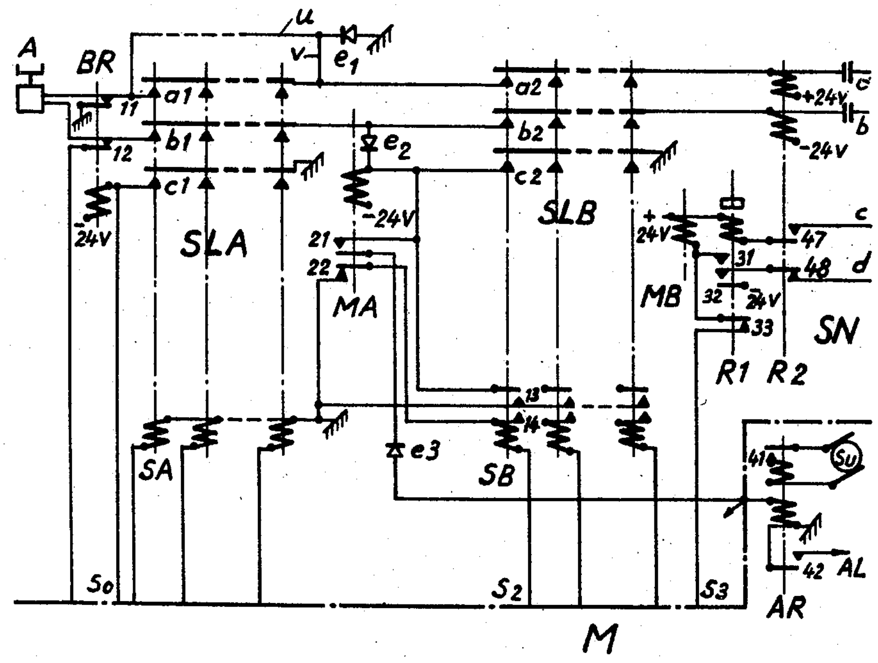
Fig. 3 shows control of the circuit system by means of a rectifier.

Fig. 3 shows how the blocking may be effected by rectifiers which are blocked during the communication. The marker M selects a free link circuit SN in a test circuit through the wire *s*3, the contact 33 and the operating magnet MB and a free primary operating bar for cross bar switches SLA through a test circuit including the wire *s*2, through the selecting magnet SB and the contact 22. Neither the operating magnet MB nor the selecting magnet SB is operated by the testing. Then the selecting magnet SA is operated after which the marker increases the current in the wire *s*2 so that the selecting magnet SB attracts its armature. The contacts 13—14 are actuated. The operating magnet MA attracts its armature. The contacts 21, 22, *a*1, *b*1 and *c*1 are actuated. The selecting magnet SB is kept energized through the contact 14 until the circuit over the wire *s*2 is broken from the marker. Then the current in the wire *s*2 is increased so that the operating magnet MB attracts its armature. The contacts *a*2, *b*2 and *c*2 are actuated. The following circuit is completed: +, 24 volts, the upper winding of the feeding relay R2 in the link circuit SN, the contacts *a*2 and *a*1, the loop through the subscriber's apparatus A, the contacts *b*1, and *b*2, the lower winding of the relay R2, to −24 volts. At the same time ground potential is kept connected over the contact *c*2 to the winding on the operating magnet MA. The contacts 47—48 are actuated. The relay R1 attracts its armature with current through the wire *c*, which is connected to a device for releasing the link circuit if the switching operation does not proceed normally. The contacts 31—33 are actuated. The operating magnet MB is kept energized through contacts 31 and 32. Impulse series, which are sent from the apparatus A, are transferred by the relay R2 to the wire *d* by means of the contact 48.

Independent of the resistance in the loop over the subscriber's apparatus A the rectifiers *e*1 and *e*2 are kept blocked after the link circuit SN has been connected. If the line is short-circuited both calling wires obtain ground potential and the rectifiers remain blocked. If the line is open, as e.g. during an impulse from a dial on the apparatus A, both rectifiers obtain a blocking voltage of 24 volts. The rectifier *e*3 is kept short-circuited by the contact *c*2. If the current from the wire *c* is broken, the relay R1 releases its armature. The operating magnet MB releases its armature and the contacts *a*2, *b*2 and *c*2 are closed.

The following circuit is completed: +, ground, rectifier *e*1, contact *a*1, the loop over the apparatus A, contact *b*1, rectifier *e*2, the winding on the operating magnet MA to minus 24 volts. The operating magnet MA is kept in operated position. At the same time the alarm relay AR is energized through the rectifier *e*3 and the contact 21. As the lower winding of the relay AR has a high resistance this circuit will not influence the operating magnet MA appreciably and therefore the blocking stops as soon as the subscriber puts down his hand set because the operating magnet MA releases its armature.

The rectifier *e*1 may be connected to the contact *a*2 through the connection *v* or to the contact *a*1 through the connection *u*. In the latter case a rectifier *e*1 is required per subscriber but the contact 11 may be eliminated in this case.

Figure 4A:
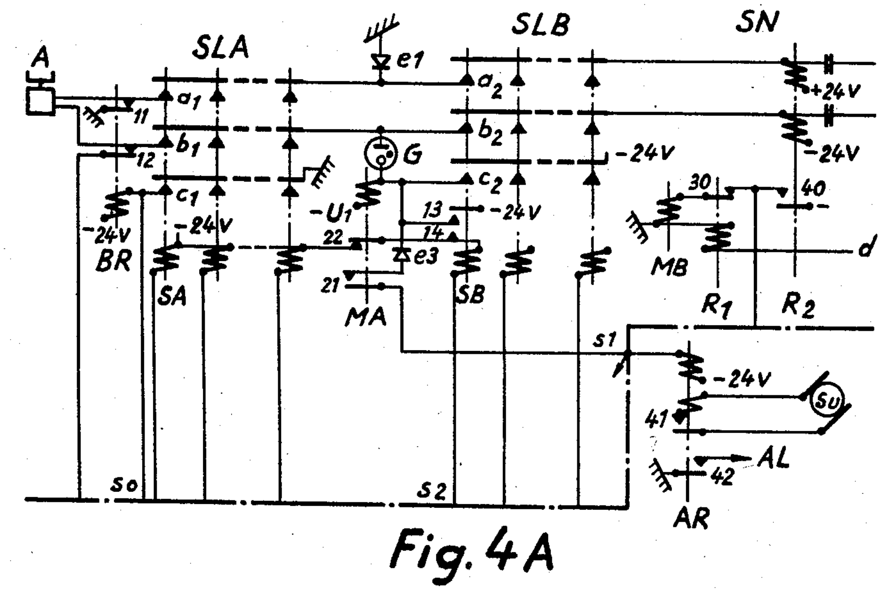
Fig. 4 shows control of the circuit system by means of a gaseous discharge tube.

Figs. 4A and B show how at least one rectifier in Fig. 3 may be replaced by a gaseous discharge tube. In this case the rectifier *e*2 is replaced with a glow discharge tube G. In Fig. 4A the operating magnet MA is connected to an auxiliary battery with the voltage −U1, which is sufficiently high to ionize the glow discharge tube G.

The marker M sets up the connection by operating the selecting magnets SA and SB and the operating magnet MB in mentioned order. Thus the operating magnet MA is operated through the contact 13 and attracts its armature. The contacts *a*1, *b*1, *c*1, 21—22 and *a*2, *b*2 and *c*2 are actuated. The relay BR actuates the contacts 11—12 and the feeding relay R2 is connected to the subscriber's line. The connection is held by the contact 40 and the relay set SN is supposed to pertain to a semi-automatic exchange, which is served manually. During the communication the rectifier *e*1 is kept blocked and the glow discharge tube G is prevented from being ionized by the contact strip to the contact *c*2 being connected to −24 volts. If the operator wishes to release the connection she pushes a push button which connects the wire *d* to the battery, whereby the relay R1 is operated and attracts its armature. The contact 30 is actuated and the operating magnet MB releases its armature. The contacts *a*2, *b*2 and *c*2 open. The glow discharge tube G is now ionized in the following circuit: ground, the rectifier *e*1, contact *a*1, the loop through the apparatus A, which is supposed to be closed, contact *b*1, the glow discharge tube G, the winding on the operating magnet MA, to the voltage −U1. Thus the magnet MA is operated until the loop is broken. The alarm relay AR is operated over the contact 21 and the rectifier *e*3 as has been described above.

If there is no free operator, when the apparatus A begins a call, a free primary operating bar for cross-bar switches SLA is selected neverthless and the selecting magnets SA and SB attract. The operating magnet MA attracts its armature and the selecting magnet SB is operated over the contacts 13 and 14 until the marker is released. When the selecting magnet SB releases its armature the contacts 13 and 14 open, and the glow discharge tube G is ionized as has been described above, and then the calling line is blocked and the subscriber hears a buzzar tone from the buzzer generator S*u*.

Figure 4B:
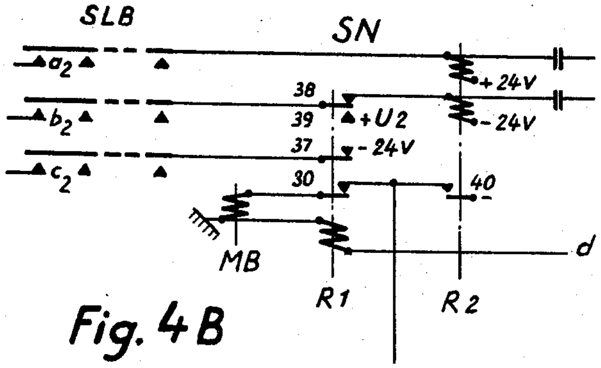

Fig. 4B shows how the voltage −U1 may be reduced from the striking voltage to the sustaining voltage for the glow discharge tube G. On the relay R1 there are applied a make-and-break contact 38, 39 and a cut-off contact 37. Simultaneously as the contact 30 breaks the current of the operating magnet MB the contact 37 breaks the short-circuit of the glow discharge tube G and the contact 39 connects a plus voltage +U2 through the contact *b*2 to the anode of the glow discharge tube. During the release time of the magnet MB the glow discharge tube G is ionized and is then kept ionized in series with the rectifier *e*1 as long as the loop through the subscriber's apparatus A is closed.

We claim:

1. An automatic telephone system comprising, in combination, a subscriber's line; a selection stage including cross-bar switches having electromagnetically operated primary and secondary operating bars, each operating bar including several sets of contact springs, a set of contact bars and an operating magnet; links joining said primary and said secondary operating bars, said line being connected to said sets of contact springs and said links being connected to the contact bars of said primary operating bars; link circuits; means for connecting said line to one of said links over one of said primary operating bars and said connected link to one of said link circuits over one of said secondary operating bars, current control means associated with said connected link, said control means being non-conducting when the said link is connected to the respective link circuit and conducting when the said link is disconnected from the respective link circuit; and a holding circuit including said control means, a winding of the operating magnet for said primary operating bar connected to the line, at least one contact in the set of contacts actuated by the primary operating bar in said holding circuit, a line loop including the subscriber's apparatus and a source of current, said holding circuit energizing the respective operating magnet and blocking a new call until the line loop is broken.

2. An automatic telephone system according to claim 1, wherein said current control means comprise at least one rectifying means, said rectifying means being blocked when the connected link is connected to a link circuit.

3. An automatic telephone system according to claim 1, wherein said current control means comprise at least one gaseous tube, said link circuits including means responsive to the disconnection of the link circuits for ionizing the gaseous tube.

4. An automatic telephone system according to claim 1, wherein the said link circuits include means responsive to the disconnection thereof for actuating said current control means.

References Cited in the file of this patent

UNITED STATES PATENTS

| | | |
|---|---|---|
| 1,991,193 | Carpenter et al. | Feb. 12, 1935 |
| 2,410,304 | Powell | Oct. 29, 1946 |
| 2,650,950 | Kessler | Sept. 1, 1953 |
| 2,826,640 | Williford | Mar. 11, 1958 |